United States Patent [19]

Fabbro et al.

[11] Patent Number: 4,784,245

[45] Date of Patent: Nov. 15, 1988

[54] BRAKE MOTOR HAVING A RESETTABLE AUTOMATIC ADJUSTMENT DEVICE

[75] Inventors: Edgard Fabbro, Le Vésinet; Pierre Pressaco, La Courneuve, both of France

[73] Assignee: Bendix France, Drancy, France

[21] Appl. No.: 60,181

[22] Filed: Jun. 9, 1987

[30] Foreign Application Priority Data

Jun. 18, 1986 [FR] France .................. 86 08812

[51] Int. Cl.⁴ .......................... F16D 65/56
[52] U.S. Cl. .................. 188/196 D; 188/71.9; 188/196 M; 192/70.25; 192/111 A
[58] Field of Search .......... 188/71.9, 196 D, 196 BA, 188/196 M; 192/70.25, 111 A

[56] References Cited

U.S. PATENT DOCUMENTS

| | | | |
|---|---|---|---|
| 4,056,173 | 11/1977 | Farr | 188/71.9 |
| 4,246,985 | 1/1981 | Shimizu et al. | 188/71.9 |
| 4,270,634 | 6/1981 | Matsuzaki | 188/196 BA X |
| 4,596,315 | 6/1986 | Takeuchi et al. | 188/196 D X |
| 4,629,038 | 12/1986 | Pressaco et al. | 188/71.9 |
| 4,637,498 | 1/1987 | Thompson et al. | 188/71.9 |
| 4,645,038 | 2/1987 | Meynier | 188/71.9 |
| 4,681,194 | 7/1987 | Tsuruta | 188/71.9 |

FOREIGN PATENT DOCUMENTS 0154398 9/1985 European Pat. Off. .
2131053 1/1973 Fed. Rep. of Germany .

*Primary Examiner*—George E. A. Halvosa
*Attorney, Agent, or Firm*—Larry J. Palguta; Ken C. Decker

[57] ABSTRACT

The rotating member (17) of the automatic adjustment device interacts in frictional engagement with a non-rotating plunger (8) of the mechanical control device (9), the adjustment member locked in rotation (18) of the automatic adjustment device having an end (19) passing sealingly and slideably through the front wall (4) of the brake piston (1) and maneuverable (38) manually to carry out resetting of the automatic adjustment device, the adjustment member locked in rotation (18) being pushed in frictional connection (30, 31) with the brake piston (1) to be normally locked in rotation when the brake motor is in operation.

17 Claims, 2 Drawing Sheets

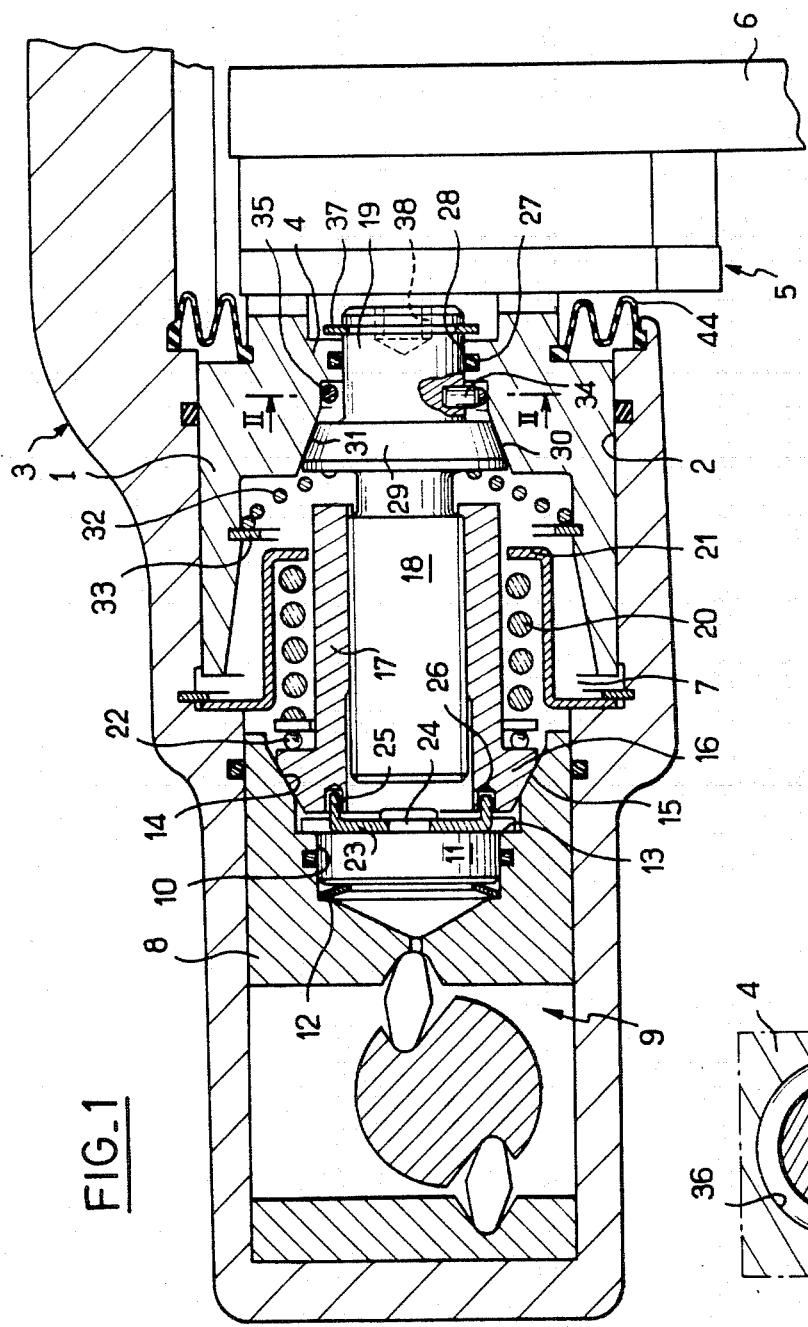
FIG_1
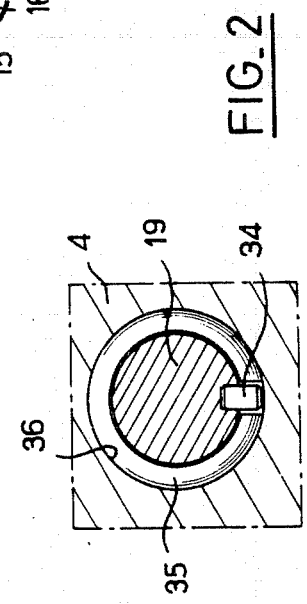
FIG_2

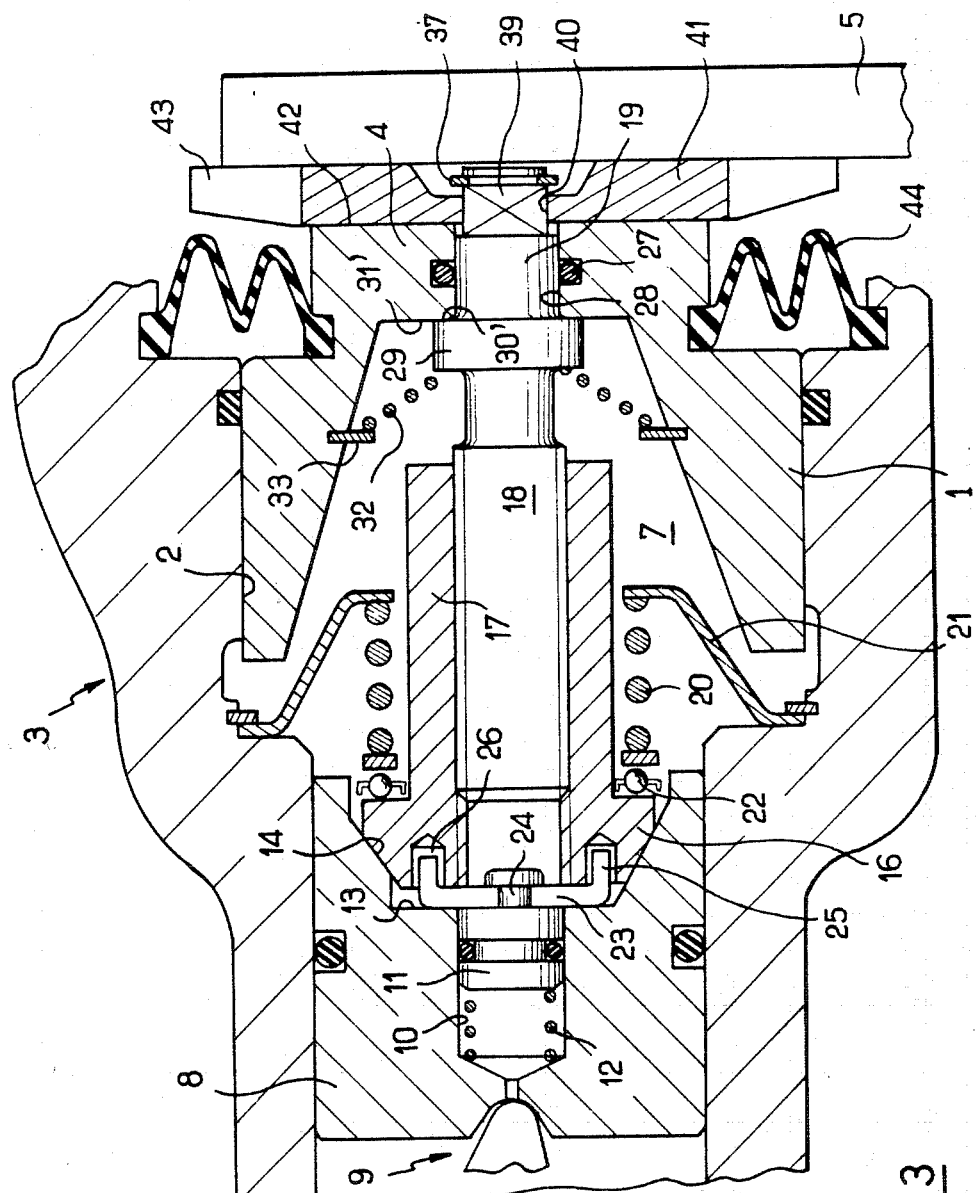

BRAKE MOTOR HAVING A RESETTABLE AUTOMATIC ADJUSTMENT DEVICE

The present invention concerns brake motors, particularly for vehicle disc brakes, of the type comprising a brake piston sliding in a bore of a body and actuable, either hydraulically, or mechanically by a mechanical control to move a friction member via an automatic wear take-up device of the screw/nut type with reversible thread having an adjustment member locked in rotation, carried by a front wall in the brake piston near the friction member and interacting with a rotating adjustment member pushed in free frictional engagement against a non-rotating component of the mechanical control, and means manually actuable for resetting the automatic adjustment device.

A brake motor of this type is described in U.S. Pat. No. 4,629,038. In the brake motor, in this document, the resetting means is made up of a control rod in the shape of a conical pinion fitted in the body of the brake and actuable by driving in rotation the rotating member of the automatic adjustment device so as to rescrew it onto the adjustment member locked in rotation fastened by one of its ends to the front wall of the brake piston, in a relatively complex and costly system, requiring, for arranging the resetting means, a considerable axial length for the brake motor assembly which could entail the risk of structural weakness in the brake body.

The object of the present invention is to provide a brake motor of compact design of the type under consideration, in a lightened and simplified arrangement and with greater reliability, and permitting the integration of additional functions.

To do this, according to a feature of the invention, the adjustment member locked in rotation comprises an end passing sealingly and slideably through the front wall of the brake piston, means of frictional connection, working at least when the brake motor is in operation, being provided between the brake piston and the adjustment member locked in rotation to lock this latter normally in rotation, the end of the adjustment member locked in rotation being actuable manually in rotation from the outside to carry out the resetting of the automatic adjustment device by causing the adjustment member, normally locked in rotation, to rotate on its axis and overcoming, if need be, the frictional connection means, and thus re-screwing it into the rotating adjustment member, held, at rest, in frictional engagement with the non-rotating component of the mechanical control, and so locked in rotation.

According to another feature of the invention, the member normally locked in rotation is pushed in the direction towards the friction component bearing against the front wall of the brake piston.

With such an arrangement, the resetting, to replace a worn friction member with a new friction member, is carried out through the front wall of the brake piston on the member usually locked in rotation, in an arrangement essentially integral in the brake piston and thus not requiring structural modifications to the brake body, without any direct outside intervention on the rotating adjustment member and its surrounding friction connection, which comprises the particularly delicate subassembly of the brake motor, the locking in rotation, in operation, of the adjustment member locked in rotation and its setting in the brake piston guaranteeing reliable and accurate operation of the automatic adjustment device and the accuracy of its operating clearances when the brake is brought into use.

According to another feature of the invention, the brake motor also comprises hydraulic means f inhibiting the automatic adjustment device, typically made up of an inhibiting piston sealingly and slideably mounted in the non-rotating component of the mechanical control, interacting selectively with the rotating adjustment member to prevent rotation thereof when the hydraulic operating pressure of the brake piston exceeds a preset value.

Other features and advantages of the present invention will become evident from the following description made with reference to the accompanying drawings, in which:

FIG. 1 is a view in longitudinal section of a first embodiment of a brake motor according to the invention;

FIG. 2 is a partial view in cross-section according to the sectional plane II—II of the FIG. 1; and FIG. 3 is a view similar to FIG. 1 showing a second embodiment of the invention.

In the description which follows and in the drawings, identical or similar components have the same reference numbers, possibly with indices.

The brake motor shown in the figures comprises generally a hollow brake piston, marked usually by the reference 1, mounted axially slideably in a bore 2 of a brake body 3, actually a disc brake caliper slideably carried on a fixed support (not shown). The piston 1 has a front end wall 4 projecting beyond the bore 2 and intended to interact, in direct or indirect engagement, with a friction member 5, to push this latter flat against a braking member in frictional engagement, in this instance a brake disc 6. In the embodiments shown, the brake piston 1 demarcates the end, in the bore 2, of an hydraulic chamber 7, the other end being demarcated by a plunger piston 8 mounted sealingly and slideably axially in a rear part of reduced diameter of the bore 2 and actuable by a mechanical actuator 9 ensuring typically the function of a parking brake, the mechanical connection between the plunger piston 8 and the actuator 9 preventing the rotation of the plunger piston 8 in the body 3.

An inhibiting piston 11 is sealingly and slideably mounted in a front housing 10 of the plunger piston 8 axially pushed forwards by a spring 12 bearing on the bottom of the recess 10. The housing 10 opens out, towards the front, into a part of the bore of enlarged internal diameter joined to the housing 10 forming a radial shoulder 13 broadened out towards the front to make up an inner divergent conical surface 14 forming a surface of friction connection with a matching conical surface 15 formed by a rear part of enlarged outside diameter 16 of a rotating adjustment device, made up here in the shape of a nut 17, screwed, in reversible thread engagement, on the rear threaded end of an adjustment member locked in rotation made here in the shape of a screw 18, carried in the front wall 4 of the brake piston 1 by its front end 19.

The rotating adjustment member 17 is pushed by frictional engagement of its conical face 15 against the conical face 14 of the plunger piston 8 by a strong return spring 20 bearing at the front on a cage 21 integral with the body 3 and, at the back, via an axial abutment 22, on the front face of the end part of enlarged diameter 16 of the rotating member 17, the spring 20 holding the plunger piston 8 in a rear retracted position in engagement with the mechanical actuator 9. A locking disc 23 is mounted centrally and able to rotate on its own axis, in a groove of a front boss 24 integral with the inhibiting piston 11, the back face of the disc 23 extending near, axially, to the annular shoulder 13. The disc 23 has, locally, lugs 25 bent over axially forwards and located with axial clearance in the matching recesses 26 made in the rear face of the rotating member 17.

According to one feature of the invention, the front end 19 of the screw 18 has a main part of cylindrical shape moving along a central through bore 28, formed in the front wall 4, slideably sealed by a seal 27.

In the embodiment in FIG. 1, the end 19 is connected to the threaded part of the screw 18 by an intermediate part of enlarged outside diameter 29 comprising, periphally, a conical surface converging forwards 30 intended to interact in frictional engagement and locked with a matching conical surface 31 made in the front wall 4 of the piston 1. The surface 30 is pushed in frictional engagement with the surface 31 by a spring 32 bearing at the front on the rear face of the intermediate part 29 of the screw 18, and, at the back, on a washer 33 integral with the piston 1. Because of the compactness of the brake motor according to the invention and the matching structure of the spring 32, in addition to the frictional engagement between the surfaces 30 and 31 under the effect of the spring 32 intended normally to prevent the rotation of the screw 18 relative to the piston 1, a projecting part extending radially, for example a peg 34, is advantageously provided on the end 19, arranged in line with and opposite the ends of an annular C spring 35, interacting by its periphery in frictional engagement with the inside wall 36 of an intermediate part of the bore between the conical surface 31 and the bore 28 in the front wall 4. In the embodiment of FIG. 1, a circlip 37 is mounted on the outer part of the end 19 of the screw 18 restricting the movement inwards of the screw 18 relative to the piston 1. A recess 38 is formed in the front face of the end 19 of the screw 18, for example of female hexagon pattern, intended to accept an actuating tool as will be seen later on.

The operation of the brake motor which has just been described is as follows: when functioning hydraulically, the pressure in the chamber 7 causes a movement of the piston 1 towards the front, permitted by the operating clearances in the automatic adjustment device, to force the friction member 5 against the member to be braked 6. When the friction member 5 becomes worn, the obtaining of correct braking calls for a further movement forward of the piston 1 which then takes with it forwards axially, via the screw 18 held axially locked and in rotation in the configuration shown in FIG. 1 by the springs 32 and 35 and by the pressure in the chamber 7, the nut 17 to meet the spring 20, thus freeing the friction faces 14 and 15 from one another and thus permitting, under the effect of the spring 20, the nut 17 to unscrew itself in relation to the screw 18 and to come back into engagement by its face 15 against the face 14, the play resulting from wear of the friction member 5 being thus automatically taken up. During this phase of automatic adjustment, corresponding to an operating pressure lower than the preset value, the ring 23 may turn relative to the inhibiting piston 11, thus not preventing the rotation in view of the adjustment of the nut 17. If, on the other hand, the operating pressure exceeds the preset value, the resulting load exerted on the inhibiting piston 11 then becomes sufficient to push this latter back to the rear, to meet the spring 12, and so place the rear face of the disc 23 flat against the shoulder 13 in friction engagement, thereby locking the disc 23 in rotation and, therefore, via the lugs 25 in the recesses 26, the nut 17, in such a manner that the abovementioned forward movement of the nut 17, via the screw 18 separating the faces 14 and 15 from one another, cannot be conveyed, under the effect of the spring 20, by a rotation of the nut 17 locked in rotation by the disc 23, so preventing an overadjustment of the brake motor.

For the resetting of the automatic device, after removal of the worn friction member 5, an actuating tool, for example, a male hexagon key, is inserted in the recess 38 so that a torque applied to the key enables the screw 18 to turn forcing frictional connections between the faces 30 and 31 and the spring 35 and the wall 36. As the nut 17 remains locked in rotation by engagement between the faces 14 and 15 under the effect of the spring 20, the rotation of the screw 18 causes the latter to rescrew itself into the nut 17, its return being accompanied, because of the engagement between the circlip 37 and the adjacent front face of the front wall 4 of the piston 1, by return of this latter to the initial position shown in FIG. 1.

For the mechanical operation of the brake, a rotation of the mechanical actuator 9 causes the plunger piston 8 to move forward, transmitted, via the nut 17 and the screw 18 to the piston 1, on the one hand confirming the engagement between the faces 14 and 15, and, on the other hand, faces 30 and 31, to apply similarly the friction member 5 against the member to be braked 6, no adjustment whatsoever taking place during the mechanical operating phases.

The embodiment shown in FIG. 3 differs essentially from that which has just been described relative to FIGS. 1 and 2 by the method of locking in rotation and the resetting action of the screw 18. In the embodiment of FIG. 3, the intermediate part of enlarged diameter 29 is attached to the cylindrical end 19 by an annular shoulder 30′ coming to bear, under the effect of the spring 32, in abutment, against the adjacent inside annular face 31′ of the forward front wall of the piston 1. On the other hand, the end 19 here has an external part of polygonal section 39 on which is fitted, by a central orifice of matching section 40, a disc 41 inserted between the front face 42 of the front wall 4 and the friction member 5. A circlip 37 mounted on the end 19 retains the disc in position on the screw 18. The disc 41 is made with teeth or slots 43 on its periphery to allow it to be rotated manually, by, for example, a screwdriver. The operation of the embodiment of FIG. 3 is, in the main, similar to that which has been described relative to the embodiment of FIG. 1, except that the locking of the screw 18 in rotation is ensured, here, when the brake is activated, by the blocking in frictional contact of the disc 41 between the front face 42 of the piston 1 and the friction member 5, in hydraulic operation mode just as in mechanical operation mode by the actuator 9. On the other hand, for the resetting of the automatic adjustment device, the disc 41 should thus be made to turn, via the slots 43, the brake being at rest, the rotation of the disc 41 causing a rotation of the screw 18 resulting, as earlier, in a simultaneous return of the screw 18 and the piston 1 to the initial rest position shown in FIG. 3. The embodiment of FIG. 3 offers the particular advantage that the disc 41 protects the protective bellows 44 traditionally inserted between the piston 1 and the body 3, from any inopportune contact with the friction member 5.

Although the present invention has been described relative to particular embodiments, it is not in fact limited thereby, but is, on the contrary, amenable to modifications and variations which will be apparent to the person skilled in the art. In particular, the rotating member may be made in the form of a screw having the end head 6 and interacting with a nut open-ended at the rear, and extending forwards to form the end 19.

We claim:

1. A brake motor, comprising a brake piston sliding in a bore in a body and actuatable hydraulically and mechanically by a mechanical control to move a friction member via an automatic adjustment device of reversing thread nut/screw type comprising an adjustment member locked in rotation carried by a front wall of the brake piston which is adjacent the friction member and interacting with a rotating adjustment member biased by a spring and in free frictional engagement against a nonrotating component of the mechanical control, and means manually actuatable for resetting the automatic adjustment device, characterized in that the adjustment member locked in rotation comprises an integral end which is integral with the adjustment member locked in rotation and passing sealingly and slidably through the front wall of the brake piston, means for frictional engagement working at least when the brake motor is in operation and being provided between the brake piston and the adjustment member locked in rotation to lock the adjustment member locked in rotation, the integral end of the adjustment member locked in rotation being rotatably actuatable exteriorly and manually to carry out resetting of the automatic adjustment device, the integral end extending through the front wall and accessible for direct manual adjustment thereof, and the adjustment member locked in rotation being directly and exteriorly actuatable, via the integral end, to effect said resetting without requiring axial displacement thereof.

2. The brake motor according to claim 1, characterized in that the adjustment member is biased in a direction toward the friction member which bears against the front wall of the brake piston.

3. The brake motor according to claim 1, characterized in that the means for frictional engagement comprises interacting surfaces integral respectively with the adjustment member and the front wall.

4. The brake motor according to claim 3, characterized in that the interacting surfaces are formed respectively on a front part of the adjustment member near the integral end and in a part of the front wall.

5. The brake motor according to claim 4, characterized in that the motor comprises hydraulic means for inhibiting the automatic adjustment device and which interacts selectively with the rotating adjustment member to prevent rotation thereof when hydraulic operating pressure of the brake exceeds a preset value.

6. The brake motor according to claim 5, characterized in that the inhibiting means comprises an inhibiting piston sealingly and slidably mounted in the non-rotating component of the mechanical control.

7. The brake motor according to claim 6, characterized in that the inhibiting piston is mounted in a bore of the non-rotating component, the bore coaxial with the rotating adjustment member, and the inhibiting piston connected to a locking component integral in rotation with the rotating adjustment member and able to interact in frictional engagement against an adjacent surface of the non-rotating component of the mechanical control.

8. The brake motor according to claim 7, characterized in that the locking component is carried in rotation on an end of the inhibiting piston and comprises projecting lugs aligned to slide axially in corresponding recesses of the rotating adjustment member.

9. The brake motor according to claim 2, characterized in that the motor comprises a resilient member pushing the inhibiting piston in a direction toward the rotating adjustment member.

10. A brake motor comprising a brake piston sliding in a bore in a body and actuatable hydraulically and mechanically by a mechanical control to move a friction member via an automatic adjustment device of reversing thread nut/screw type comprising an adjustment member locked in rotation carried by a front wall of the brake piston which is adjacent the friction member and interacting with a rotating adjustment member biased by a spring and in free frictional engagement against a non-rotating component of the mechanical control, and means manually actuatable for resetting the automatic adjustment device, characterized in that the adjustment member locked in rotation comprises an integral end which is integral with the adjustment member locked in rotation and passing sealingly and slidably through the front wall of the brake piston, means for frictional engagement working at least when the brake motor is in operation and being provided between the brake piston and the adjustment member locked in rotation to lock the adjustment member locked in rotation, the integral end of the adjustment member locked in rotation being rotatably actuatable exteriorly and manually to carry out resetting of the automatic adjustment device, the integral end extending through the front wall and non-rotatably attached to a resetting member disposed axially between the front wall of the brake piston and the friction member, and adjustment member locked in rotation actuatable, via the resetting member, to effect said resetting without requiring axial displacement of the adjustment member locked in rotation and resetting member.

11. The brake motor according to claim 10, characterized in that the means for frictional engagement comprises interacting surfaces between the adjustment member locked in rotation and the front wall.

12. The brake motor according to claim 11, characterized in that the interacting surfaces are formed respectively on an outer part of the front wall of the brake piston and on the resetting member which is disposed between the brake piston and friction member.

13. The brake motor according to claim 12, characterized in that the motor comprises hydraulic means for inhibiting the automatic adjustment device and which interacts selectively with the rotating adjustment member to prevent rotation thereof when hydraulic operating pressure of the brake exceeds a preset value.

14. The brake motor according to claim 13, characterized in that the inhibiting means comprises an inhibiting piston sealingly and slidably mounted in the non-rotating component of the mechanical control.

15. The brake motor according to claim 14, characterized in that the inhibiting piston is mounted in a bore of the non-rotating component, the bore coaxial with the rotating adjustment member, and the inhibiting piston connected to a locking component integral in rotation with the rotating adjustment member and able to interact in frictional engagement against an adjacent surface of the non-rotating component of the mechanical control.

16. The brake motor according to claim 15, characterized in that the locking component is carried in rotation on an end of the inhibiting piston and comprises projecting lugs aligned to slide axially in corresponding recesses of the rotating adjustment member.

17. The brake motor according to claim 16, characterized in that the motor comprises a resilient member pushing the inhibiting piston in a direction toward the rotating adjustment member.

* * * * *